(12) United States Patent
Mullaney et al.

(10) Patent No.: US 10,598,880 B2
(45) Date of Patent: Mar. 24, 2020

(54) HYBRID CONDUIT SYSTEM

(71) Applicant: CommScope Technologies LLC, Hickory, NC (US)

(72) Inventors: Julian S. Mullaney, Raleigh, NC (US); Eric Emmanuel Alston, Fuquay-Varina, NC (US); William Alan Carrico, Raleigh, NC (US); Eric Ryan Chappell, Statesville, NC (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/555,243

(22) PCT Filed: Mar. 3, 2016

(86) PCT No.: PCT/US2016/020712
§ 371 (c)(1),
(2) Date: Sep. 1, 2017

(87) PCT Pub. No.: WO2016/141196
PCT Pub. Date: Sep. 9, 2016

(65) Prior Publication Data
US 2018/0052293 A1  Feb. 22, 2018

Related U.S. Application Data

(60) Provisional application No. 62/128,246, filed on Mar. 4, 2015.

(51) Int. Cl.
*G02B 6/44* (2006.01)
*G02B 6/38* (2006.01)
(Continued)

(52) U.S. Cl.
CPC ........... *G02B 6/4416* (2013.01); *G02B 6/383* (2013.01); *G02B 6/3817* (2013.01); *H01B 11/22* (2013.01);
(Continued)

(58) Field of Classification Search
CPC .. G02B 6/3817; G02B 6/3825; G02B 6/3885; G02B 6/4416
See application file for complete search history.

(56) References Cited

U.S. PATENT DOCUMENTS 6,347,172 B1   2/2002  Keller et al.
7,572,063 B2 *  8/2009  Mynott ............... G02B 6/3817
                                                    385/56

(Continued)

FOREIGN PATENT DOCUMENTS

JP   2011-197678 A   10/2011

OTHER PUBLICATIONS

International Search Report and Written Opinion of the International Searching Authority for corresponding International Patent Application No. PCT/US2016/020712 dated Jun. 13, 2016, 10 pages.

*Primary Examiner* — Sung H Pak
*Assistant Examiner* — Hoang Q Tran
(74) *Attorney, Agent, or Firm* — Merchant & Gould P.C.

(57) ABSTRACT

A hybrid conduit assembly is disclosed. In one aspect, the hybrid includes an outer jacket with a first side portion housing a first conductor, a second side portion housing a second conductor, and a hollow central conduit portion. The hybrid conduit assembly further includes a first connector assembly defining a central passageway and including first and second electrical connectors that are respectively connected to the first and second conductors. The connector assembly is configured such that it can be connected with (Continued)

other similarly configured connector assemblies such that a hybrid conduit system can be built that has a continuous passageway for the later installation of an optical fiber cable and that has that has interconnected conductors to deliver power from a power source located proximate a first end of the conduit system to an end use device proximate another end of the conduit system.

8 Claims, 10 Drawing Sheets

(51) Int. Cl.
*H01R 24/84* (2011.01)
*H01R 24/38* (2011.01)
*H01B 11/22* (2006.01)
*H01R 43/05* (2006.01)
*H01R 103/00* (2006.01)

(52) U.S. Cl.
CPC ............. *H01R 24/38* (2013.01); *H01R 24/84* (2013.01); *H01R 43/05* (2013.01); *H01R 2103/00* (2013.01); *H01R 2201/06* (2013.01)

(56) References Cited

U.S. PATENT DOCUMENTS

| | | | |
|---|---|---|---|
| 9,057,862 B2 | 6/2015 | Strasser et al. | |
| 2007/0058907 A1* | 3/2007 | Mynott | G02B 6/3817 385/61 |
| 2008/0124030 A1* | 5/2008 | Scadden | G02B 6/3817 385/62 |
| 2014/0064679 A1* | 3/2014 | Register, III | G02B 6/4416 385/101 |
| 2014/0153878 A1 | 6/2014 | Mullaney | |

* cited by examiner

HYBRID CONDUIT SYSTEM

CROSS-REFERENCE TO RELATED APPLICATION

This application is a National Stage Application of PCT/US2016/020712, filed on Mar. 3, 2016, which claims the benefit of U.S. Patent Application Ser. No. 62/128,246, filed on Mar. 4, 2015, the disclosures of which are incorporated herein by reference in their entireties. To the extent appropriate, a claim of priority is made to each of the above disclosed applications.

TECHNICAL FIELD

Conduit and conduit systems for carrying a combination of power conveying copper cables and fiber optic cables are disclosed.

BACKGROUND

Many electronic devices require a cabled telecommunications connection in addition to a wired power connection. Examples of such devices are Wi-Fi routers and hot spots and security cameras. In many instances, the telecommunications and power connections are provided by separately routed cables, and in some instances are installed by separate contractors. It is also known to provide a cable having both power cables and optical fibers within the same jacket. However, the installation of such cables can require labor intensive field termination of the optical fibers. Improvements are desired in telecommunications and power distribution systems that are capable of being manufactured and installed in a time efficient and cost effective manner.

SUMMARY

In one aspect of the disclosure, a hybrid conduit is described which includes an outer jacket having a length extending between a first and second end, and having a transverse cross-sectional profile that defines a major axis and a minor axis. The outer jacket has a height measured along the minor axis and a width measured along the major axis. The width is greater than the height such that the transverse cross-sectional profile of the outer jacket is elongated along the major axis. The outer jacket includes a first side portion, a second side portion, and a central conduit portion, each of which is positioned along the major axis with the central conduit portion being disposed between the first and second side portions. The first side portion defines a first passage within which a first conductor is disposed while the second side portion defines a second passage within which a second conductor is disposed. The central conduit portion defines a hollow conduit passage through which a fiber optic cable can be pulled after formation of the outer jacket.

In another aspect of the disclosure, a hybrid conduit assembly including the aforementioned hybrid conduit is disclosed. The hybrid conduit assembly further includes a first connector assembly which includes a connector body defining a central passageway. In one aspect, the connector body has a first end and a second end, wherein the connector body is secured to and receives a first end of the hybrid conduit outer jacket. The connector assembly also includes a first electrical connector and a second electrical connector. The first connector can be at least partially disposed within a first cavity of the connector body and in electrical communication with the first conductor while the second connector can be at least partially disposed within a second cavity of the connector body and in electrical communication with the second conductor. In another aspect, the central conduit portion of the hybrid conduit extends into the central passageway proximate the first end of the connector body. The connector assembly is configured such that it can be connected with other similarly configured connector assemblies such that a hybrid conduit system can be built that has a continuous passageway for the later installation of an optical fiber cable and that has that has interconnected conductors to deliver power from a power source located proximate a first end of the conduit system to an end use device proximate another end of the conduit system.

A method of making a hybrid conduit assembly is also disclosed. The method can include providing a first length of a hybrid conduit having an outer jacket including a first side portion, within which a first conductor is disposed, a second side portion within which a second conductor is disposed, and a hollow central conduit portion disposed between the first and second side portions. The method may also include providing a connector assembly having a first connector, a second connector, and a central passageway therebetween. The connector assembly may be attached to the hybrid conduit by inserting the central conduit portion into the connector assembly central passageway, connecting the first conductor to the first connector, and connecting the second conductor to the second connector.

A method of installing a combined power and communications distribution system is also disclosed. The method may include providing a first and second hybrid conduit assembly in accordance with the aforementioned description and connecting the connector assembly of the first hybrid conduit assembly to the connector assembly of the second hybrid conduit assembly. The method may also include providing a length of an optical fiber and routing the optical fiber through the hollow conduit portions of each of the first and second hybrid conduit assemblies.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the examples disclosed herein are based.

DETAILED DESCRIPTION

Various examples will be described in detail with reference to the drawings, wherein like reference numerals represent like parts and assemblies throughout the several views. Reference to various examples does not limit the scope of the claims attached hereto. Additionally, any examples set forth in this specification are not intended to be limiting and merely set forth some of the many possible examples for the appended claims. Referring to the drawings wherein like reference numbers correspond to like or similar components throughout the several figures.

Referring to FIGS. 1-10, a connectorized hybrid conduit assembly 10 for use in a combined power and communications distribution system 1 is shown. Use of the connectorized hybrid conduit assemblies 10 allows for the creation of one or more pathways for the simultaneous distribution of power and communications cables. In one example, the power cables are formed as part of the hybrid conduit assembly and the communications cables are later pulled through the hybrid conduit assembly after or during installation and joining of the individual conduit assembly 10 sections. In one aspect, each hybrid conduit assembly 10 includes a hybrid conduit 12. The hybrid conduit 12 has an outer jacket 14 with a length L extending between a first 16 and second end 18, and having a transverse cross-sectional profile that defines a major axis X and a minor axis Y. As shown, the outer jacket 14 has a height H measured along the minor axis Y and a width W measured along the major axis X. The width W is greater than the height H such that the transverse cross-sectional profile of the outer jacket 14 is elongated along the major axis X. The outer jacket 14 of the hybrid conduit 12 is preferably constructed of a polymeric material. In one example, the outer jacket 14 is plenum rated. In certain examples, the outer jacket 14 can be manufactured of a fire-retardant plastic material. In certain examples, the outer jacket 14 can be manufactured of a low smoke zero halogen material. Example materials for the outer jacket include polyvinyl chloride (PVC), fluorinated ethylene polymer (FEP), polyolefin formulations including, for example, polyethylene, and other materials. Additionally, the outer jacket 14 can be formed such that it is be relatively rigid or can be formed such that a high degree of flexibility is present.

Figure 1:
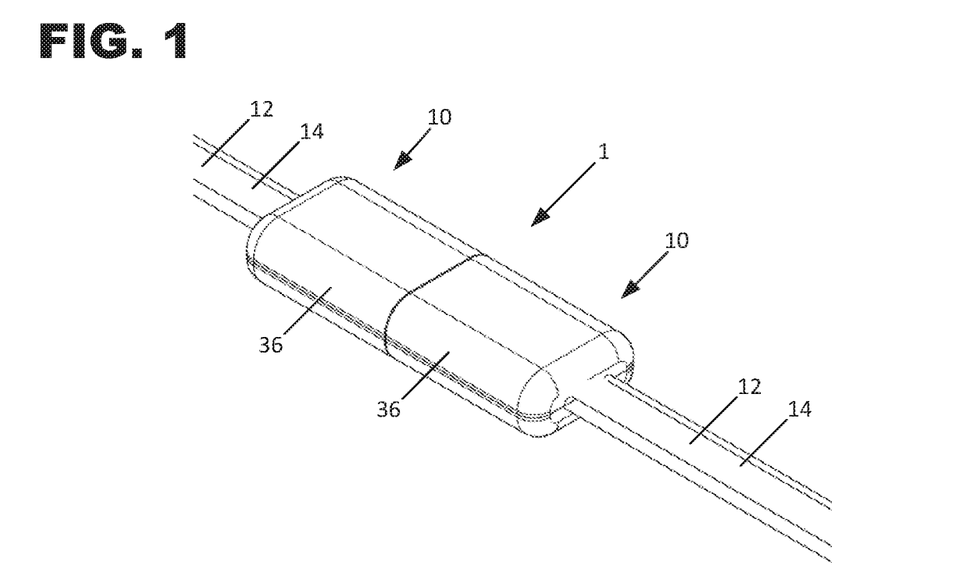
FIG. 1 is a perspective view of two interconnected hybrid conduit assemblies used to form a combined power and communications distribution system in accordance with the principles of the present disclosure.
Figure 2:
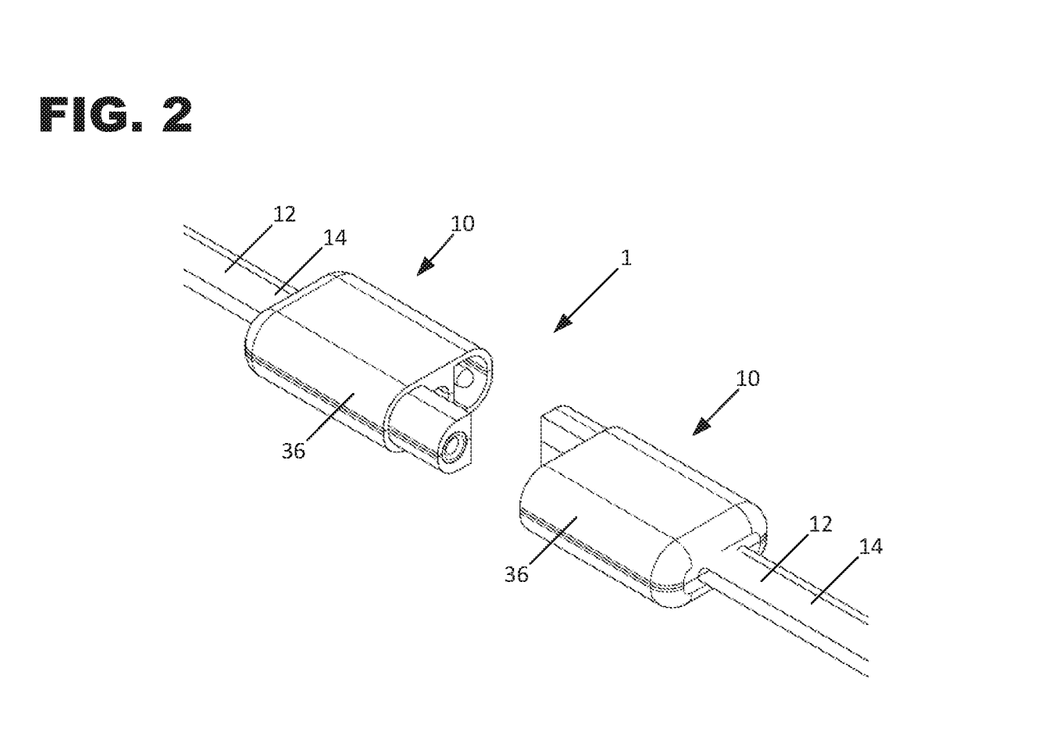
FIG. 2 is a perspective view of the hybrid conduit assemblies of FIG. 1, with the hybrid conduit systems being disconnected from each other.
Figure 3:
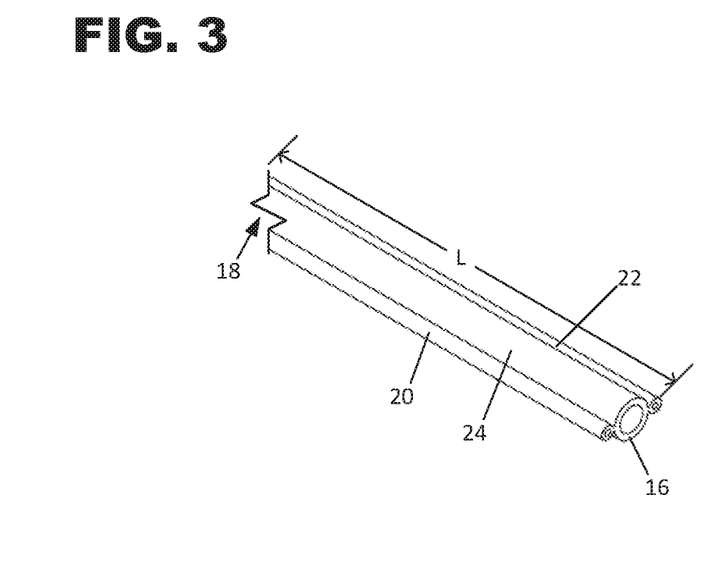
FIG. 3 is a perspective view of a section of the hybrid conduit usable to form the hybrid conduit assemblies shown in FIG. 1.
Figure 3A:
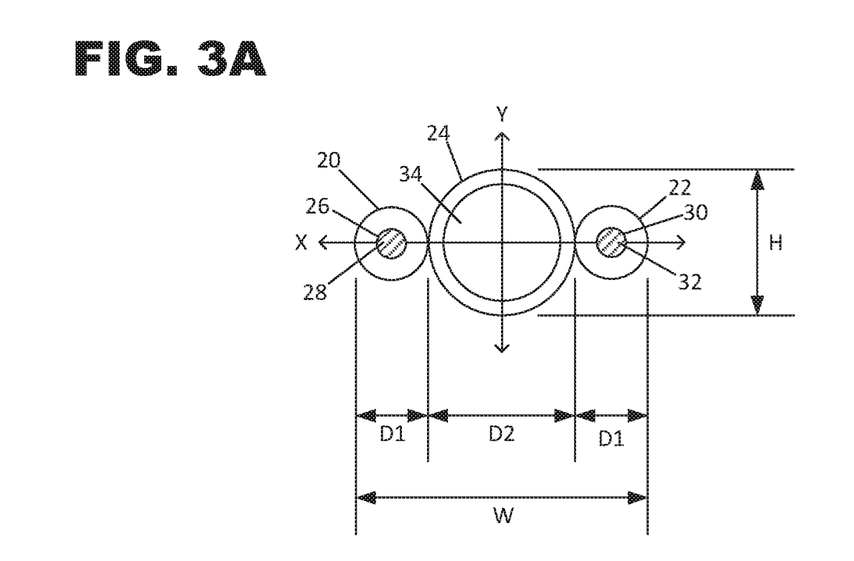
FIG. 3A is a schematic end view of the hybrid conduit shown in FIG. 3.
Figure 4:
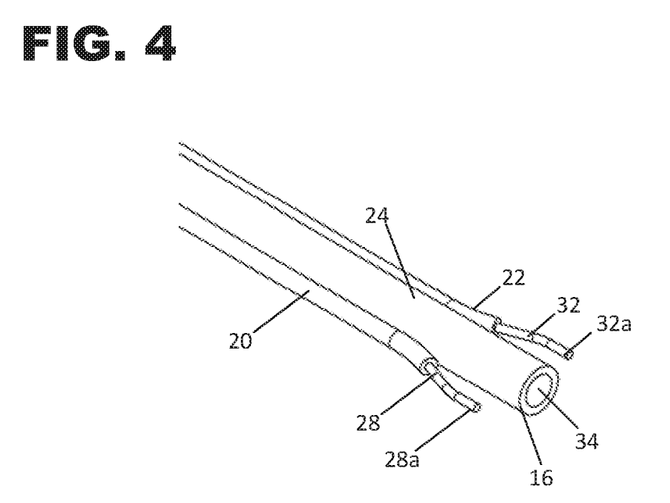
FIG. 4 is a perspective view of the section of hybrid conduit of FIG. 4 with exposed conductors.
Figure 5:
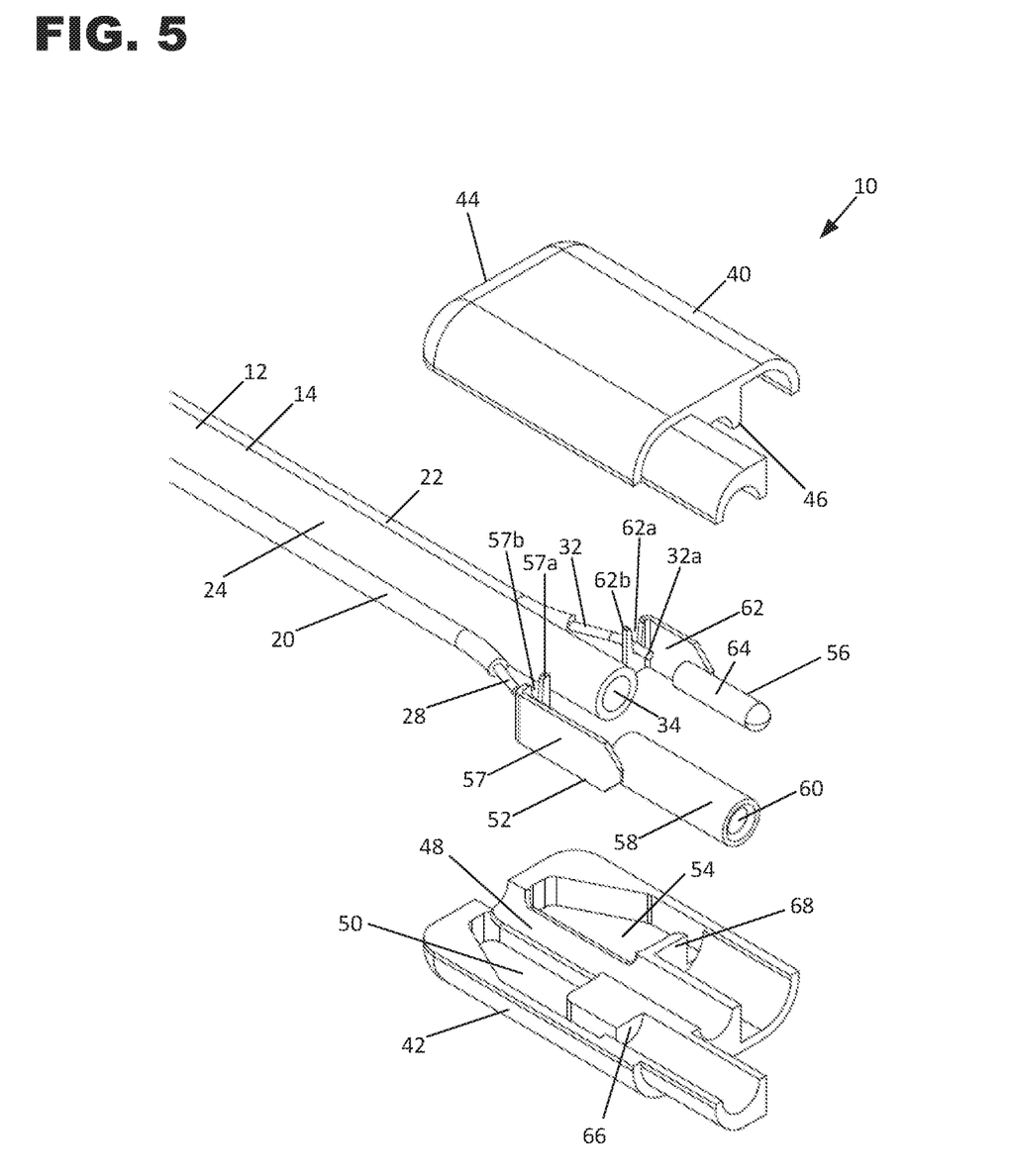
FIG. 5 is an exploded perspective view of the hybrid conduit of FIG. 4 connected to a connector assembly.
Figure 6:
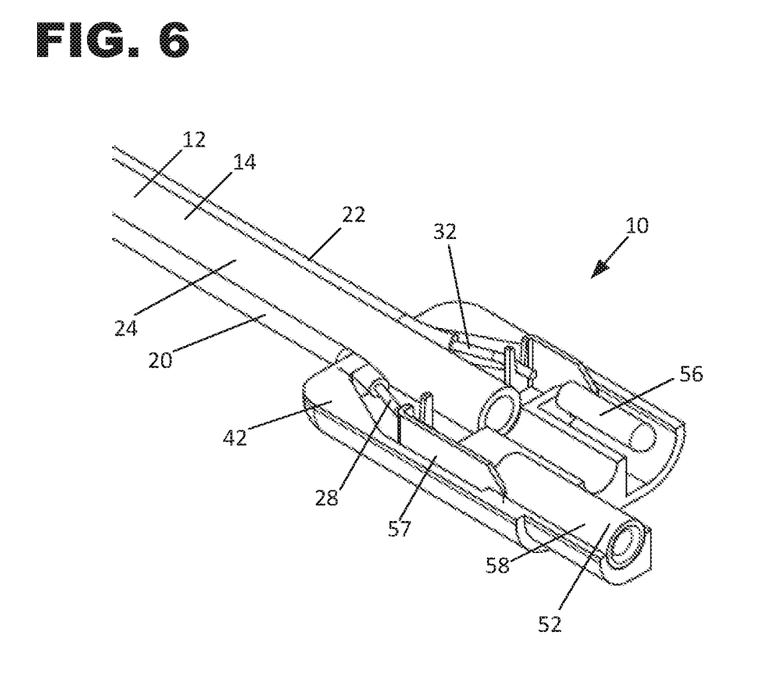
FIG. 6 is a perspective view of the hybrid conduit and connector assembly shown in FIG. 5, with a connector body bottom half installed and a connector body top half uninstalled.
Figure 7:
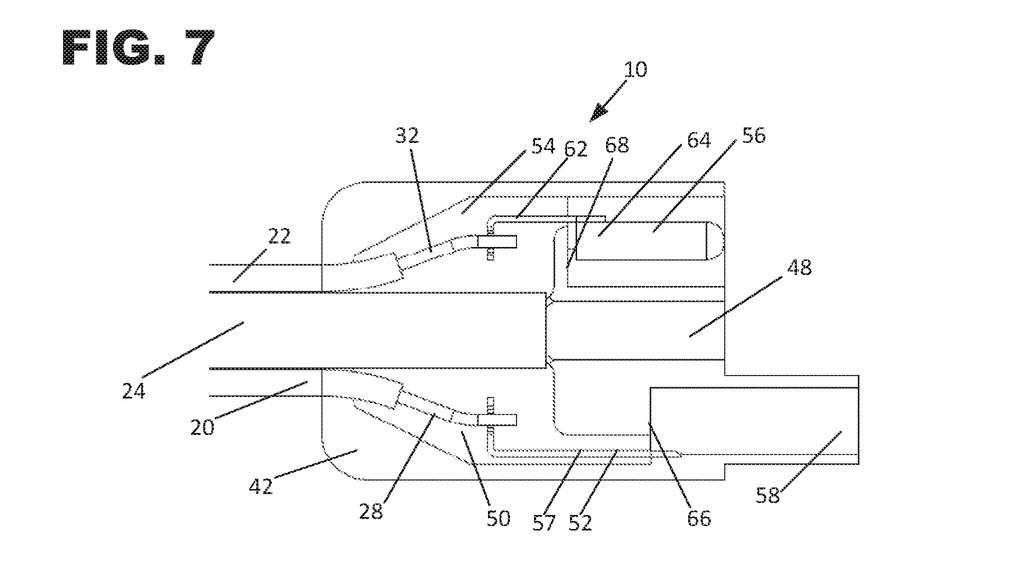
FIG. 7 is a top view of the hybrid conduit and connector assembly shown in FIG. 6.
Figure 8:
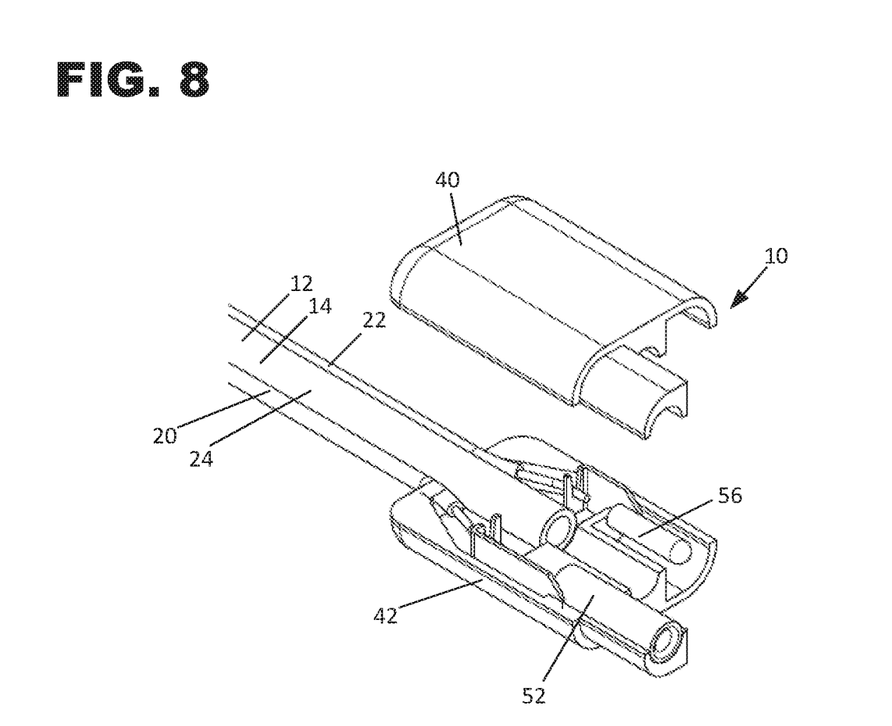
FIG. 8 a perspective view of the hybrid conduit and connector assembly shown in FIG. 6, with the connector body top half placed over the connector body bottom half.
Figure 9:
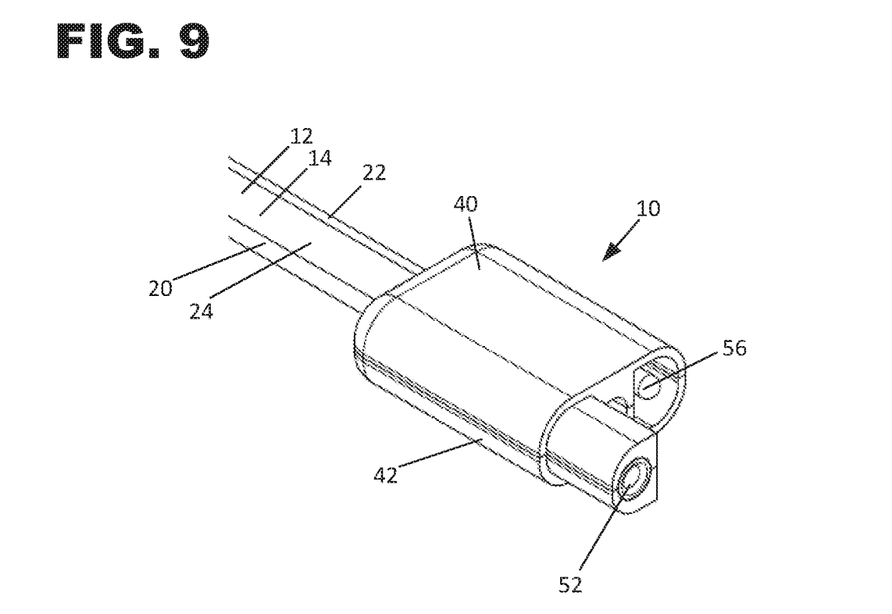
FIG. 9 is a perspective view of the hybrid conduit and connector assembly shown in FIG. 6, with the connector body fully installed onto the hybrid conduit.

As shown, hybrid conduit 12 and outer jacket 14 define a first side portion 20, a second side portion 22, and a central conduit portion 24, each of which is positioned along the major axis X with the central conduit portion 24 being disposed between the first and second side portions 20, 22. The width W of the outer jacket 14 is determined by the diameter D1 of the first and second side portions 20, 22 and the diameter D2 of the central conduit portion 24. In one aspect, the first side portion 20 defines a first passage 26 within which a first conductor 28 is disposed while the second side portion 22 defines a second passage 30 within which a second conductor 32 is disposed. The first and second conductors 28, 32 may be of any material or configuration suitable for conveying power, for example, copper, copper-covered steel, copper alloy, and stainless steel conductors. Additionally, the conductors 28, 32 may be provided as solid conductors or as stranded conductors in twisted and/or braided form. In one example, the conductors 28, 32 are 22 gauge solid copper conductors; however, any suitable gauge conductor may be used without departing from the concepts herein.

Figure 10:
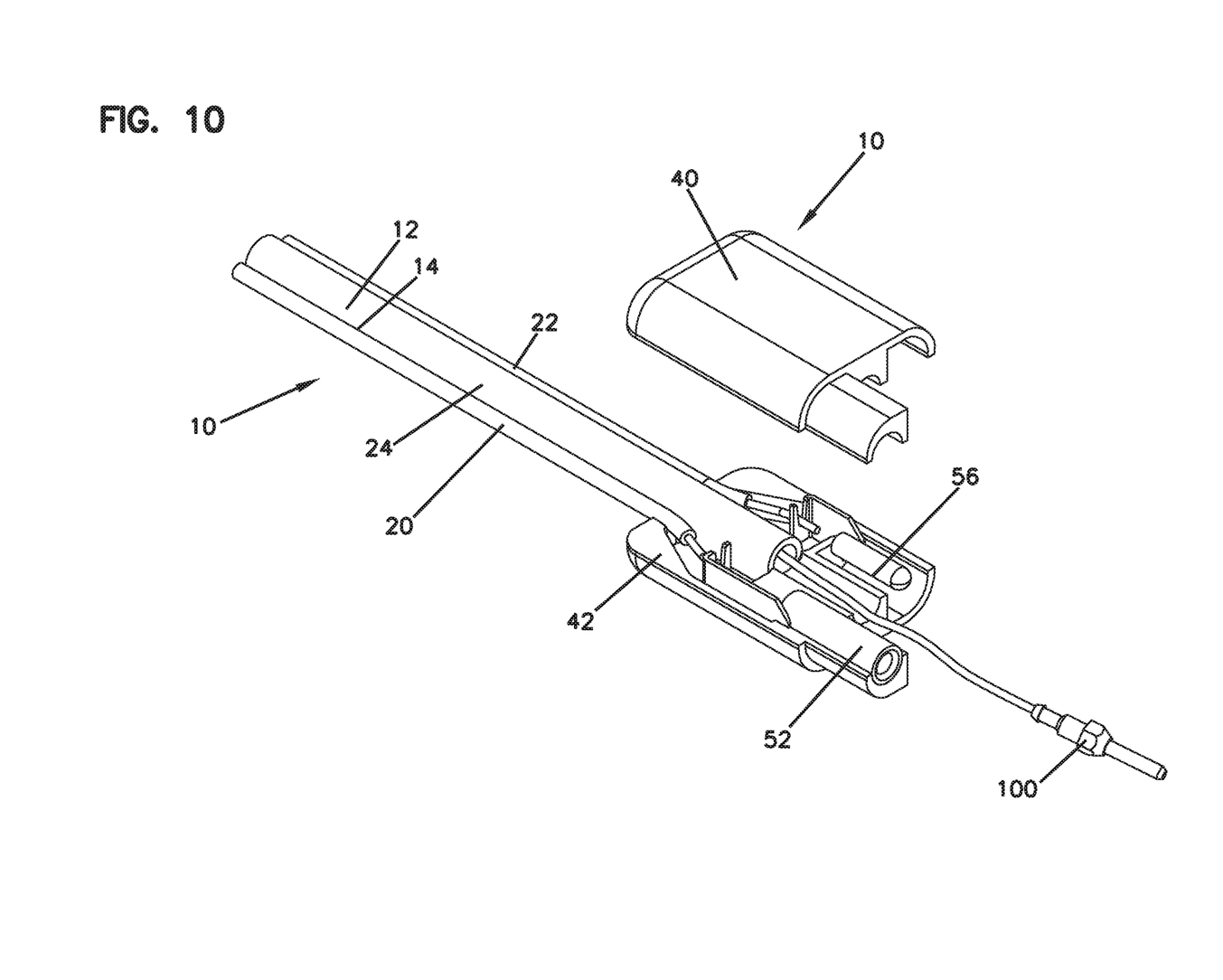
FIG. 10 is a perspective view of the hybrid conduit and connector assembly of FIG. 9, with a fiber optic cable having been pulled through the hybrid conduit and connector assembly.
Figure 11:
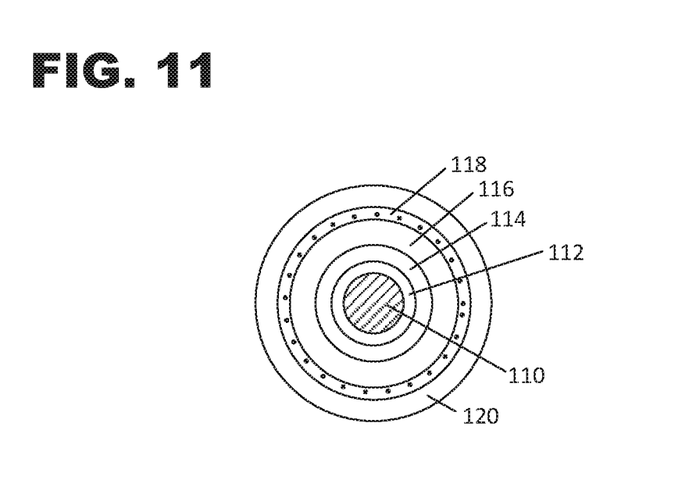
FIG. 11 is a cross-sectional view of the fiber optic cable shown in FIG. 10.

As shown, the central conduit portion 24 defines a hollow conduit passage 34 through which a fiber optic cable 100 can be pushed, pulled, blown or otherwise routed after formation of the outer jacket 14, as shown in FIG. 10. With reference to FIG. 11, the fiber optic cable 100 can have a core 110, a cladding layer 112, a coating layer 114, a buffer layer 116, a strength layer 118, and an outer jacket 120. The fiber optic cable 100 can also include multiple optical fibers (e.g. core 110, cladding 112) within the same outer jacket 120. In one example, the strength layer includes aramid synthetic fibers (e.g. KEVLAR® fibers) that provide the fiber optic cable 100 with sufficient stiffness to allow the fiber optic cable 100 to be pushed through the central passage 34 of the conduit 12. Steel wire may also be used for the strength layer 118. In one example, the fiber optic cable 100 has a nominal diameter of less than 3 millimeters (mm), a diameter of less than 2 mm, and/or a diameter of less than 1 mm. In one example, the cable 100 has a nominal diameter from about 800 to about 900 microns and includes a plurality of individual optical fibers (e.g. core 110, cladding 112) of about 250 microns. In one example, the cable 100 has a pull rating sufficient to allow the cable 100 to be pulled through the central passage 34 without damaging the fibers, for example a pull rating of about 300 Newtons. In one example, the central conduit portion 24 has a dimension D2 of about 5 mm and a central passage 34 inner diameter of about 3.5 mm through which a fiber optic cable 100 having a single optical fiber is routed. In one example, the central conduit portion 24 has a dimension D2 of about 8.5 mm and a central passage 34 inner diameter of about 6 mm through which a fiber optic cable 100 having multiple optical fibers is routed.

Figure 12:
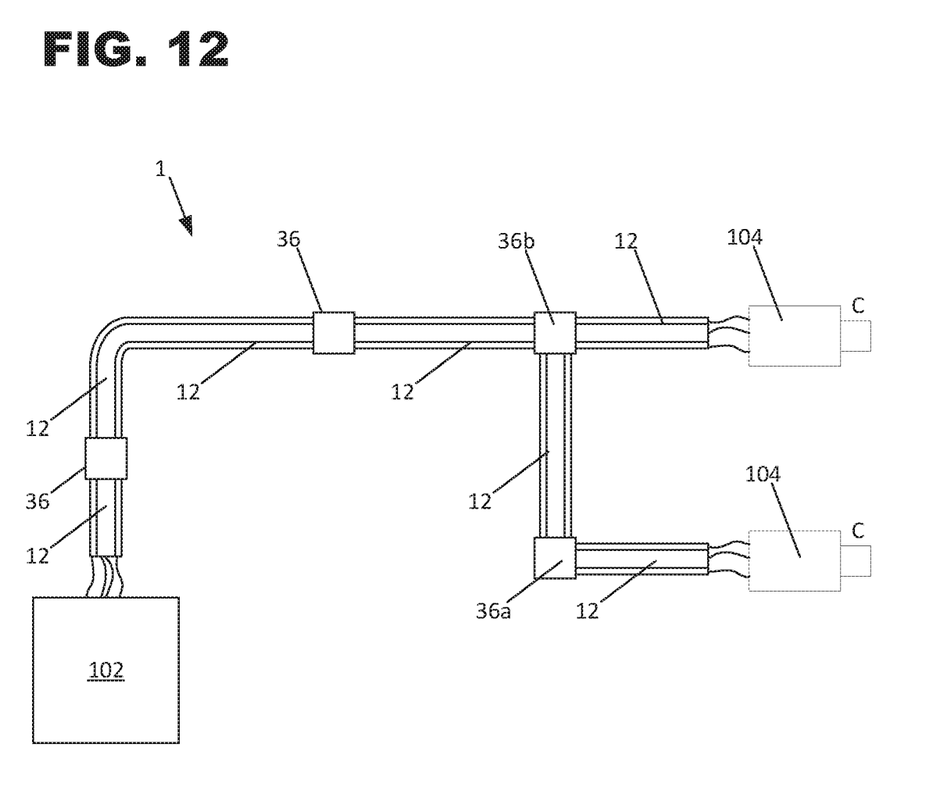
FIG. 12 is a schematic view of a combined power and communications distribution system formed from joined sections of the hybrid conduit assemblies shown in FIG. 1.

The hybrid conduit assembly 10 can further include a connector assembly 36 connected to one of the ends 16, 18 of the hybrid conduit 12. The connector assembly 36 is configured such that it can be connected with other similarly configured connector assemblies 36. As such, the connector assemblies 36 allow for the construction of a hybrid conduit system 1 which has a continuous central passageway 34/48 for the later installation of an optical fiber cable 100 and that has that has interconnected conductors 28, 32 to deliver power from a power source 102 located proximate a first end of the conduit system 2 to an end use device 104 proximate another end 4, 6 of the conduit system. Referring to FIG. 12, such a system 1 is shown in which connector assemblies 36 are utilized, wherein some of the connector assemblies 36 are configured as 90 degree elbow connectors 36a and as three-way tee connectors 36b. It is noted that the hybrid conduit 12 can be provided with enough flexibility to be routed around 90 degree corners without collapsing the central passageway 34, thereby eliminating any need for any elbow connectors 36a. In one example, the hybrid conduit 12 can have a flexibility or stiffness equivalent to a coaxial cable and can be wrapped at a bend radius as low as 2 to 3 inches without kinking or collapsing central passageway 34. In one example, the end use devices 104 are security cameras. In one example, the power source 102 also includes a telecommunications component for receiving the optical fiber 100.

In one aspect, the connector assembly 36 includes a connector body 38 extending between first and second ends 44, 46. In the example embodiment shown, connector body 38 includes an upper half portion 40 that is mated to a mirror image lower half portion 42. In one aspect, the upper and lower half portions 40, 42 are mate together along a plane that is parallel to the major axis X. In one example, the connector body 38 is formed from a polymeric material. The upper and lower half portions 40, 42 may be joined together by any suitable means, such as by a plastic welding process or by an adhesive, such as epoxy. Once joined, the upper and lower half portions 40, 42 effectively clamp the outer jacket 14 of the hybrid conduit 12 such that each of the first side portion 20, the second side portion 22, and the central conduit portion 24 are fully secured to the connector body 38.

In one aspect, the connector body 38 defines a central passageway 48. The central passageway 48 is configured to extend between the first and second ends 44, 46 and is of a sufficient internal diameter to receive and connect to one end 16, 18 of the central conduit portion 24. Accordingly, the central passageways 48 of two connected connector bodies 38, in combination with the hollow conduit passages 34 of the connected central conduit portions 24, form a continuous passageway through which an optical fiber cable 100 may be pulled after assembly of the system 1.

The connector body is also configured to define a female cavity structure 50 for housing a female connector 52. As shown, the female connector 52 is formed from an electrically conductive material and includes an extension portion 57 connected to an exposed end 28a of the first conductor 28 and a female plug portion 58 having a hollow portion 60 into which the male connector 56 of a connected connector assembly 36 is inserted. The connection between the first conductor 28 and the extension portion 57 may be secured by any suitable means, such as by soldering or crimping. In one example, the extension portion 57 includes a bent section 57a having a notch or v-shaped recess 57b for accepting the first conductor 28.

The connector body is further configured to define a male cavity structure 54 for housing a male connector 56. As shown, the male connector 56 is formed from an electrically conductive material and includes an extension portion 62 connected to an exposed end 32a of the second conductor 32 and a male plug portion 64. The connection between the second conductor 32 and the extension portion 62 may be secured by any suitable means, such as by soldering or crimping. In one example, the extension portion 62 includes a bent section 62a having a notch or v-shaped recess 62b for accepting the second conductor 32. As shown, the female cavity structure 50 is extended relative to the male cavity structure 54, such that when two connector bodies 38 are connected, the female cavity structure 50 and the female connector 52 extend into the male cavity structure 54 such that the male connector 56 is guided into the hollow portion 60 of the female connector 52.

In one example, the female cavity structure 50 includes a wall structure 66 against which the female plug portion 58 can be supported while the male plug portion 64 is being inserted when the connector assemblies 36 are being connected together. Similarly, the male cavity structure 54 can also be provided with a wall structure 68 against which the male plug portion 64 can be supported while being inserted into the female plug portion 58 of another connector assembly 36. As configured, the wall structures 66, 68 isolate physical forces exerted during connection of the connector assemblies 36 from the connection points between the conductors 28, 32 an the connectors 52, 56 so as to ensure that these connections are protected from such forces.

Figure 13:
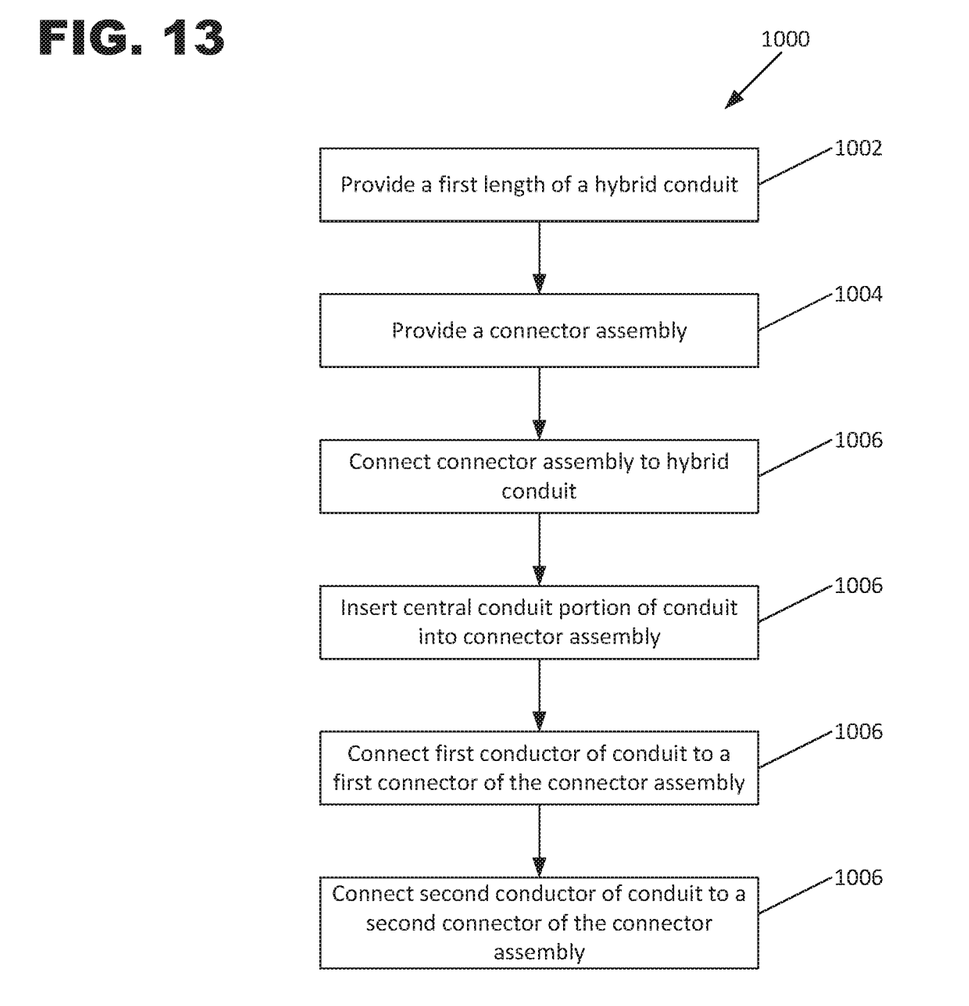
FIG. 13 is a process flow diagram showing a method for making a combined power and communications distribution system.

Referring to FIG. 13, an example of system and process 1000 in accordance with the disclosure is presented. It is noted that although the figures diagrammatically show steps in a particular order, the described procedures are not necessarily intended to be limited to being performed in the shown order. Rather at least some of the shown steps may be performed in an overlapping manner, in a different order and/or simultaneously. Also, the process shown in FIG. 13 is exemplary in nature and other steps or combinations of steps may be incorporated or altered without departing from the central concepts disclosed herein.

As presented, process 1000 is directed to a method of making a hybrid conduit assembly. In a step 1002, a first length of a hybrid conduit is provided. As discussed previously, the hybrid conduit may have an outer jacket including a first side portion within which a first conductor is disposed, a second side portion within which a second conductor is disposed, and a hollow central conduit portion disposed between the first and second side portions. In a step 1004, a connector assembly is provided, which may have a first connector, a second connector, and a central passageway therebetween. In a step 1006, the connector assembly is attached to the hybrid conduit by attaching the connector assembly to the hybrid conduit by inserting the central conduit portion into the connector assembly central passageway at step 1006a, connecting the first conductor to the first connector at step 1006b, and connecting the second conductor to the second connector at step 1006c. In one example, the step 1006 may further include separating a portion of the first side portion from the central conduit portion and removing a portion of the first side portion to expose the first conductor, separating a portion of the first side portion from the central conduit portion and removing a portion of the first side portion to expose the first conductor, and connecting the exposed portions of the first and second conductors to the first and second connectors, respectively. The step 1004 may further include providing a connector assembly having a connector body first half and a connector body second half, wherein, after connecting the first and second conductors to the first and second connectors, the connector body first half is mated with the connector body second half to form a connector body that at least partially encloses the first and second connectors and entirely encloses the exposed portions of the first and second conductors.

In accordance with the above, a method of installing a combined power and communications distribution system is evident. For example, first and second hybrid conduit assemblies in accordance with the above can be provided, wherein the connector assembly of the first hybrid conduit assembly is connected to the connector assembly of the second hybrid conduit assembly. Subsequently, a length of an optical fiber cable is provided which is then be routed the optical fiber through the hollow conduit portions of each of the first and second hybrid conduit assemblies. As previously described, the optical fiber cable and the electrical conductors can be connected to an end use device at one end and to a power supply source and/or a communications device at the other end.

While the best modes for carrying out the many aspects of the present teachings have been described in detail, those familiar with the art to which these teachings relate will recognize various alternative aspects for practicing the present teachings that are within the scope of the appended claims.

What is claimed is:

1. A hybrid conduit assembly comprising:
   a) an outer jacket having a length extending between a first and second end, and having a transverse cross-sectional profile that defines a major axis and a minor axis, the outer jacket having a height measured along the minor axis and a width measured along the major axis, the width being greater than the height such that the transverse cross-sectional profile of the outer jacket is elongated along the major axis;
   b) the outer jacket including a first side portion, a second side portion and a central conduit portion, the first side, second side, and central conduit portions being positioned along the major axis with the central conduit portion being disposed between the first and second side portions:
      i) the first side portion defining a first passage within which a first conductor is disposed;
      ii) the second side portion defining a second passage within which a second conductor is disposed;
      iii) the central conduit portion defining a hollow conduit passage;
   c) a first connector assembly attached to the hybrid conduit, the first connector assembly comprising:
      i) a connector body extending along a first direction from a first end to a second end, the second send being at an end face of the connector body configured to connect to another connector body, wherein the first end of the connector body is secured to and receives the first end of the hybrid conduit outer jacket;
      ii) a first connector at least partially disposed within a first cavity of the connector body, the first connector being in electrical communication with the first conductor;
      iii) a second connector at least partially disposed within a second cavity of the connector body, the second connector being in electrical communication with the second conductor; and
      iv) a central passageway extending between the first and second ends of the connector body, wherein the central conduit portion extends into the central passageway proximate the first end of the connector body; and
   d) a fiber optic cable including a cable outer jacket, the cable outer jacket extending through at least a portion of the central conduit portion, the central passageway, and beyond the end face of the connector body along the first direction.

2. The hybrid conduit assembly of claim 1, wherein the first connector assembly is configured to connect with a similarly configured second connector assembly associated with a second hybrid conduit.

3. A method of making a hybrid conduit assembly comprising:
   a) providing a first length of a hybrid conduit having:
      i) an outer jacket including a first side portion within which a first conductor is disposed, a second side portion within which a second conductor is disposed, and a hollow and empty central conduit portion disposed between the first and second side portions;
   b) providing a connector assembly having a first connector, a second connector, and a central passageway therebetween;
   c) attaching the connector assembly to the hybrid conduit by:
      i) inserting the central conduit portion into the connector assembly central passageway;
      ii) connecting the first conductor to the first connector; and
      iii) connecting the second conductor to the second connector;
   d) separating a portion of the first side portion from the central conduit portion and removing a portion of the first side portion to expose the first conductor;
   e) separating a portion of the second side portion from the central conduit portion and removing a portion of the second side portion to expose the second conductor;
   f) connecting the exposed portion of the first conductor to the first connector;
   g) connecting the exposed portion of the second conductor to the second connector;
   h) providing a connector assembly having a connector body first half and a connector body second half;
   i) after connecting the first and second conductors to the first and second connectors, mating the connector body first half with the connector body second half to form a connector body that at least partially encloses the first and second connectors and entirely encloses the exposed portions of the first and second conductors; and
   j) after the steps a)-i), inserting and routing a fiber optic cable through the empty central conduit portion and the central passageway.

4. The method of claim 3, wherein the hybrid conduit assembly is a first hybrid conduit assembly, and the method further comprises:
   providing a second hybrid conduit assembly; and
   connecting the connector assembly of the first hybrid conduit assembly to a connector assembly of the second hybrid conduit assembly.

5. A system for extending a hybrid conduit, the system comprising:
   a first subassembly comprising:
      a first hybrid conduit,
      a first conductor,
      a first connector forming a first electrical connection interface,
      a first hollow pass-through channel; and
   a second subassembly comprising:
      a second hybrid conduit,
      a second conductor,
      a second connector forming a second electrical connection interface,
      a second hollow pass-through channel, and a fiber optic cable including a cable outer jacket extending through both the first and second hollow pass-through channels;

wherein the first subassembly and the second subassembly mate together at a connection joint which includes an electrical connection between the first and second electrical connection interfaces.

6. The hybrid conduit assembly of claim 1, wherein the fiber optic cable is one or more of pushably routable, pullably routable, and blowingly routable through the central conduit portion and the central passageway.

7. The method of claim 3, wherein the routing the fiber optic cable includes one or more of: pushing the fiber optic cable, pulling the fiber optic cable, and blowing the fiber optic cable.

8. The system of claim 5, wherein the fiber optic cable is one or more of pushably routable, pullably routable, and blowingly routable through the first and second hollow pass-through channels.

\* \* \* \* \*